US010958906B2

(12) United States Patent
Cremon

(10) Patent No.: US 10,958,906 B2
(45) Date of Patent: Mar. 23, 2021

(54) ENCODING DATA ARRAYS

(71) Applicant: Arm Limited, Cambridge (GB)

(72) Inventor: Jonas Christensson Cremon, Lund (SE)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 16/659,342

(22) Filed: Oct. 21, 2019

(65) Prior Publication Data
US 2020/0145660 A1 May 7, 2020

(30) Foreign Application Priority Data

Nov. 2, 2018 (GB) ..................................... 1817920

(51) Int. Cl.
| | |
|---|---|
| *H04N 19/119* | (2014.01) |
| *H04N 19/14* | (2014.01) |
| *H04N 19/176* | (2014.01) |
| *G06F 17/16* | (2006.01) |
| *G06F 17/18* | (2006.01) |

(52) U.S. Cl.
CPC .......... *H04N 19/119* (2014.11); *G06F 17/16* (2013.01); *G06F 17/18* (2013.01); *H04N 19/14* (2014.11); *H04N 19/176* (2014.11)

(58) Field of Classification Search
CPC ....... G06F 17/16; G06F 17/18; H04N 19/119; H04N 19/14; H04N 19/176; H04N 19/192; H04N 19/85
See application file for complete search history.

(56) References Cited

U.S. PATENT DOCUMENTS

| | | | | | |
|---|---|---|---|---|---|
| 5,251,029 | A | * | 10/1993 | Enari | .................... H04N 19/176 375/240.03 |
| 5,253,075 | A | * | 10/1993 | Sugiyama | ............ H04N 19/176 382/239 |
| 5,263,100 | A | * | 11/1993 | Kim | ..................... H04N 9/8047 382/166 |
| 5,459,518 | A | * | 10/1995 | Wickstrom | .............. H04N 7/54 375/240.03 |

(Continued)

OTHER PUBLICATIONS

GB Combined Search and Examination Report dated Apr. 23, 2019, GB Patent Application No. GB1817920.0.

*Primary Examiner* — Peter D Le
(74) *Attorney, Agent, or Firm* — Vierra Magen Marcus LLP

(57) ABSTRACT

An apparatus for encoding arrays of data elements of a stream of arrays of data elements. The apparatus includes encoding circuitry for encoding an array of data elements. The apparatus also includes processing circuitry for producing two one-dimensional arrays of data values from a two-dimensional array of data values. The data values of the two-dimensional array are representative of the properties of the array of data elements. The data values of the two one-dimensional arrays are representative of the data values along the two dimensions of the two-dimensional array respectively. The processing circuitry is operable to use the two one-dimensional arrays to approximate data values in the two-dimensional array, and to use the approximated data values of the two-dimensional array when encoding arrays of data elements in the stream of arrays to be encoded.

19 Claims, 5 Drawing Sheets

(56) References Cited

U.S. PATENT DOCUMENTS

| | | | | |
|---|---|---|---|---|
| 5,726,711 A | * | 3/1998 | Boyce | H04N 5/783 |
| | | | | 348/408.1 |
| 5,796,435 A | * | 8/1998 | Nonomura | H04N 7/148 |
| | | | | 348/E7.082 |
| 5,828,782 A | * | 10/1998 | Sunakawa | G06K 9/00456 |
| | | | | 382/173 |
| 6,167,161 A | * | 12/2000 | Oami | G06T 9/007 |
| | | | | 375/240.2 |
| 2010/0226429 A1 | * | 9/2010 | Lee | H04N 19/176 |
| | | | | 375/240.03 |
| 2011/0116543 A1 | * | 5/2011 | Malvar | H04N 19/60 |
| | | | | 375/240.03 |
| 2013/0114695 A1 | * | 5/2013 | Joshi | H04N 19/126 |
| | | | | 375/240.03 |
| 2015/0110173 A1 | | 4/2015 | Bultje | |

* cited by examiner

ENCODING DATA ARRAYS

BACKGROUND

This technology described herein relates to a method of and apparatus for encoding data arrays, and in particular to encoding streams of data arrays, such as in the case of encoding frames of video data, e.g. for transmission and/or storage.

It is common to encode a stream (sequence) of arrays of data elements, such as arrays of image data values (e.g. frames of video for display), so as to compress the data in order to reduce bandwidth and memory consumption. This is particularly desirable in data processing apparatus, e.g. portable devices, where processing resources and power may be limited. The encoded arrays may then, e.g., be written out to memory and subsequently read and decoded for output (e.g. display).

The particular encoding process to use when encoding an array may vary between the arrays in a stream of arrays, e.g. to achieve desired rates of compression and data quality. In general the aim is to maximise the compression of the arrays in the stream (so as at least to achieve a desired bit rate), while trying to maintain as high quality for the reproduced arrays when they are decoded as possible. A particular encoding process may vary, for example, the particular size of the blocks into which an array is divided for the purposes of encoding, or the particular way in which the reference arrays (relative to which the arrays may be encoded) are derived.

When encoding an array in a stream of arrays, e.g. relative to a previous array in the stream, it is useful to know in advance (or be able to predict) the data elements in the array being encoded (e.g. what a frame of video image data looks like). This helps to make encoding decisions, e.g. to optimise the quality of the encoded data versus the number of bits output for an encoded array. A good first approximation may be to assume that the current array being encoded has the same data elements as the previous array (e.g. which it is being encoded relative to). However, it may be beneficial to detect that something in the stream of arrays has changed (or is predicted to change), so that the encoding can react appropriately.

To help with this, statistical information may be collected during the encoding process from analysis of the arrays being encoded. Such statistical information may, for example, relate to the distribution of properties of the data elements in the array being encoded, such as brightness, level of detail, complexity, etc., across the array. The particular encoding process to use when encoding an array may then be controlled using the statistical information that has been gathered.

The Applicants accordingly believe that there remains scope for improved techniques for encoding streams of data arrays, e.g. using statistical data to control the encoding of arrays of data elements.

BRIEF DESCRIPTION OF THE DRAWINGS

A number of embodiments of the technology described herein will now be described by way of example only and with reference to the accompanying drawings, in which.

DETAILED DESCRIPTION

Figure 1:
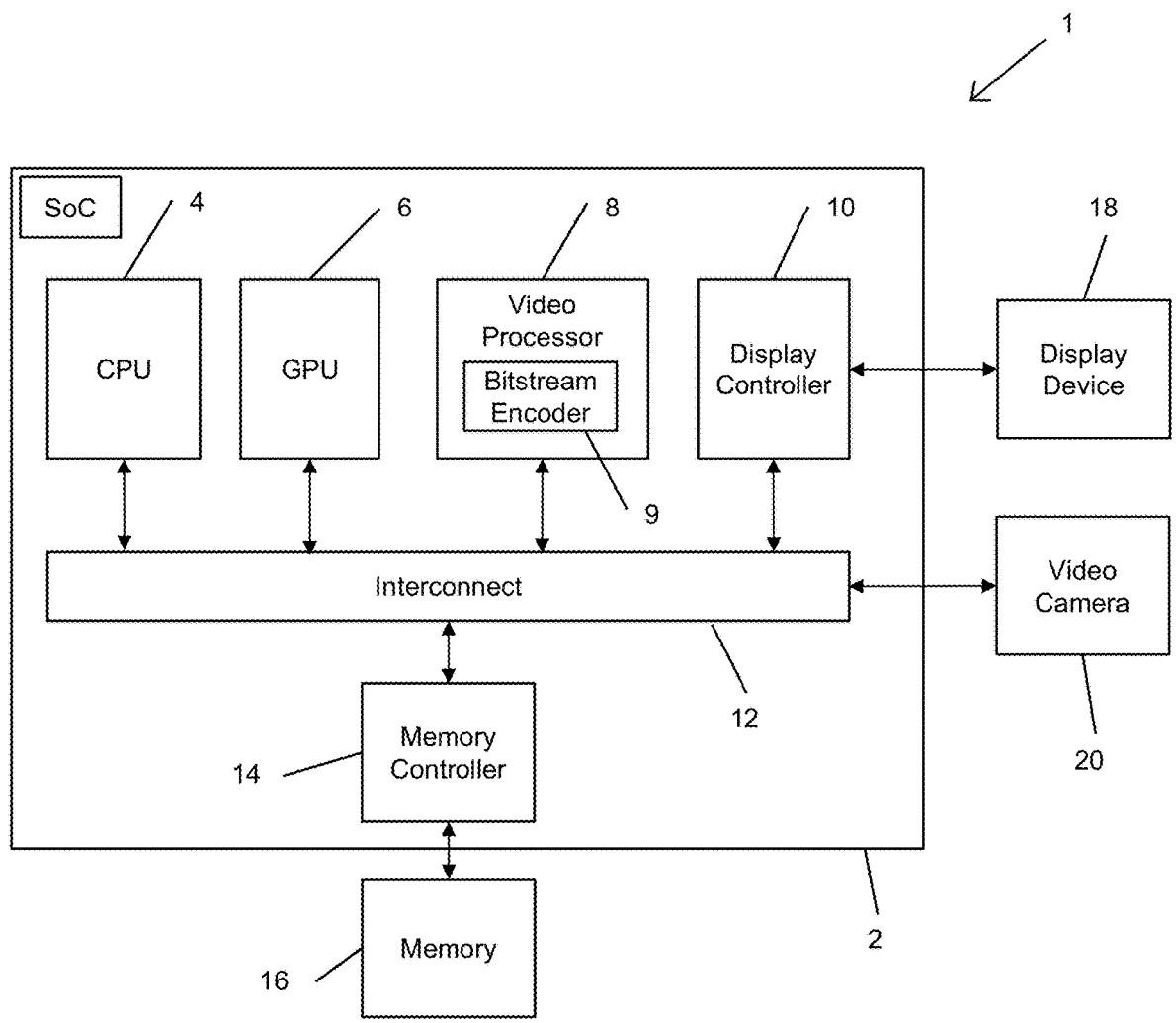
FIG. 1 shows schematically an embodiment of a data processing system that can be operated in accordance with embodiments of the technology described herein.

An embodiment of the technology described herein comprises a method of encoding arrays of data elements of a stream of arrays of data elements, the method comprising:

when encoding an array of data elements in a stream of arrays of data elements to be encoded:

producing two one-dimensional arrays of data values from the data values of a two-dimensional array of data values, wherein the data values of the two-dimensional array of data values are representative of one or more properties of at least some of the data elements in the array of data elements, and wherein the data values of the two one-dimensional arrays of data values are representative of the data values along the two dimensions of the two-dimensional array of data values respectively;

storing the two one-dimensional arrays of data values; and using the two one-dimensional arrays of data values to approximate one or more of the data values in the two-dimensional array of data values when encoding the array of data elements or one or more subsequent arrays of data elements in the stream of arrays of data elements to be encoded.

Another embodiment of the technology described herein comprises an apparatus for encoding arrays of data elements of a stream of arrays of data elements, the apparatus comprising:

encoding circuitry operable to encode an array of data elements of a stream of arrays of data elements;

processing circuitry operable to:

produce two one-dimensional arrays of data values from the data values of a two-dimensional array of data values, wherein the data values of the two-dimensional array of data values are representative of one or more properties of at least some of the data elements in the array of data elements, and wherein the data values of the two one-dimensional arrays of data values are representative of the data values along the two dimensions of the two-dimensional array of data values respectively; and a memory operable to store the two one-dimensional arrays of data values;

wherein the processing circuitry is further operable to use the two one-dimensional arrays of data values to approximate one or more of the data values in the two-dimensional array of data values; and wherein the encoding circuitry is further operable to use the one or more approximated data values of the two-dimensional array of data values when encoding the array of data elements or one or more subsequent arrays of data elements in the stream of arrays of data elements to be encoded.

The technology described herein relates to the encoding of arrays of data elements, such as frames of video image data. The arrays to be encoded are in a stream of arrays of data elements, such as a sequence of frames of video image data. When an array of data elements in the stream is to be encoded, data values of a two-dimensional array of data values may be generated. The data values of the two-dimensional array of data values are representative of one or more properties of at least some of the data elements in the array of data elements, such that the distribution of the data values of the two-dimensional array represents the distribution of at least one property of the data elements across the array.

Using the data values from this two-dimensional array, two one-dimensional arrays of data values are produced. The data values produced for the two one-dimensional arrays are representative of the data values in the direction along the two respective dimensions (e.g. x and y) of the two-dimensional array, such that the distribution of the data values in the two one-dimensional arrays represents the distribution of the data values across the two-dimensional arrays. The two one-dimensional arrays are then stored.

When encoding the array from which the two-dimensional array of data values has been generated, or when encoding one or more subsequent arrays in the stream, an approximated version of one or more data values of the two-dimensional array of data values are used in this encoding. These approximated version(s) are produced by reconstructing the data value(s) in the two-dimensional array using the two one-dimensional arrays of data values.

The Applicant has appreciated that while the distribution of one or more properties associated with the data elements of the array being encoded may be useful in the encoding of array(s) of data elements in the stream of arrays, e.g. to decide on the particular encoding process to be used, storing the full two-dimensional array of data values that is generated for such subsequent use can occupy significant amounts of memory, which is not desirable, e.g. in portable devices. However, the Applicant has recognised that by approximating the data values in the two-dimensional array using two one-dimensional arrays, the number of data values needed to represent the one or more properties of the data elements of the array is able to be reduced.

This then has the result that only two one-dimensional arrays need to be stored instead of a two-dimensional array, thus reducing the amount of memory needed for their storage. Although more arithmetic processing may be required to produce the two one-dimensional arrays from the data values of the two-dimensional array (rather than just generating the two-dimensional array), reducing the size (the number of data values) of the arrays needed to store this data may also help to reduce the processing resources for the memory transactions needed to use the stored data values in the encoding process.

Reducing the processing resources for the memory transactions when using the two one-dimensional arrays (compared to if the two-dimensional array were to be stored and used in the subsequent encoding) may help to achieve a real time rate for the generation and processing of memory transactions that may be required for the encoding of the arrays (e.g. when encoding a stream of frames of video image data), e.g. owing to the memory transaction latency and bandwidth constraints that may be present in a, e.g. portable, device.

It will be appreciated that reducing both memory and (memory transaction) processing resources also helps to reduce the energy consumption (which, again, may be constrained in a, e.g. portable, device) required to encode the arrays, while still providing data values representative of one or more properties of the data elements of the array being encoded, such that encoding decisions are able to be based on these distribution(s).

Furthermore, the Applicant has found that the approximated data values reconstructed from the two one-dimensional arrays may still be sufficiently accurate (compared to the originally generated data values of the two-dimensional array and thus representative of the one or more properties of the data elements of the array of data elements being encoded) to be able to make useful encoding decisions.

The data elements of the arrays may comprise any suitable type of data, e.g. RGB or YUV data values. In one set of embodiments the arrays of data elements comprise frames of video image data (of a stream of frames of video image data).

In any of the embodiments described herein, the arrays of data elements of the stream of arrays may be provided in any desired and suitable way. Embodiments may comprise generating (at least some or all of) the data elements of the arrays. Embodiments may also or instead comprise reading in (at least some or all of) the data elements of the arrays, e.g. from memory.

The data elements of the arrays may be generated in any desired and suitable way. In embodiments, the data elements of the arrays may be generated by a video camera. In other embodiments, generating the data elements of the arrays may comprise a rendering process. The rendering process may comprise deriving the data values represented by the data elements of the arrays (e.g. by rasterising primitives to generate graphics fragments and/or by rendering graphics fragments).

A graphics processing pipeline may be used in order to generate the data elements of the arrays. The graphics processing pipeline may contain any suitable and desired processing stages that graphics pipeline may contain, such as a vertex shader, a rasterisation stage, a rendering stage, etc., in order to generate the data elements of the arrays.

In an embodiment, the encoding process is a block-wise process that encodes arrays of data elements by dividing a data array into (plural) blocks of data elements. In one set of embodiments the (e.g. blocks of the) arrays of data elements are encoded by determining the differences (residuals) between the (e.g. blocks of the) arrays of data elements and respective reference (e.g. blocks of the) arrays of data elements.

In this case therefore, the encoding of a (and the) array of data elements may, and in an embodiment does, comprise, dividing the array into a plurality of blocks of data elements. The encoding of a (and the) array of data elements may, and in an embodiment does, comprise, for (e.g. each block of) an array: generating an array of difference values that represents the differences between (e.g. each block of) the array and a reference (e.g. block of an) array. The difference values may then be encoded, e.g. by generating an array of frequency domain coefficients for the array of difference values by applying a (e.g. Discrete Cosine Transform (DCT)) forward transformation process to the array of difference values, and/or generating an array of quantised coefficients by applying a quantisation process to the array of frequency domain coefficients.

The blocks into which an (e.g. each) array of data elements is divided may take any desired and suitable form. In embodiments, the blocks may be any desired and suitable size or shape in terms of data elements or positions. In one embodiment the blocks are rectangular (including square). For example, the blocks may (e.g. each) be 4×4, 4×8, 8×4, 8×8, 8×16, 16×8, 16×16, 16×32, 32×16, 32×32, 32×64, 64×32, 64×64, etc., data elements or positions in size. In embodiments, the blocks may (e.g. each) be one of plural blocks that the array of data elements may be divided into for encoding purposes. These plural blocks may be non-overlapping and/or may be similar or different in size or shape. The array of data elements can be any desired and suitable size, shape or configuration in terms of such blocks.

When encoding an array of data elements, in one set of embodiments some (e.g. statistical) data (e.g. metrics) is gathered that is representative of one or more properties of at least some of the data elements in the array of data elements. In one set of embodiments, such gathered data is used to generate the two-dimensional array of data values. Thus, in one set of embodiments, the method comprises (and the processing circuitry is operable to) analysing the (e.g. properties of the data elements of the) array of data elements being encoded to generate the two-dimensional array of data values.

The two-dimensional array represents the distribution of the one or more properties across the array of data elements. The two-dimensional array may thus be described by a statistical distribution $f(x,y)$, e.g. of plural discrete values.

Having knowledge of such distribution(s) helps to provide information as to the nature of the data elements in an array being encoded and, e.g., to predict how the data elements in the arrays are changing in the sequence. This information (i.e. derived from the two-dimensional array of data values) can thus be used in the encoding of array(s) in the stream of arrays.

In one embodiment the two-dimensional array of data values is generated in its entirety (and then the two one-dimensional arrays are produced from the data values of the two-dimensional array). Thus the method may comprise (and the processing circuitry may be operable to) generating a two-dimensional array of data values from the array of data elements, wherein the data values in the two-dimensional array of data values are representative of one or more properties of at least some of the data elements in the array of data elements.

In some embodiments, the two one-dimensional arrays may be produced without necessarily generating the two-dimensional in its entirety, e.g. such that the whole of the array may not be available at any one time. In these embodiments (e.g. individual) data values of the two-dimensional array may be generated when encoding an array of data elements (e.g. with particular data values of the two-dimensional array being generated when particular data elements of the array are encoded). The two one dimensional arrays may then be produced from (e.g. by accumulating) the data values of the two-dimensional array over the rows and columns of the two-dimensional array (e.g. in the manner of the embodiments outlined below), when the appropriate data values of the two-dimensional array are generated.

The two-dimensional array of data values may be generated from, and thus correspond to, the array of data elements in any suitable and desired way. In one set of embodiments the two-dimensional array of data values corresponds to (is based on) (e.g. all of) the data elements of the array of data elements.

When an array of data elements is to be encoded as plural blocks of data elements, a separate two-dimensional array could be generated for each block. However, in one set of embodiments, a single two-dimensional array (only) is generated for the whole of the array of data elements, even when the array of data elements is divided into plural blocks. This helps, for example, to identify patterns in the distribution of the one or more properties being represented by the two-dimensional array over the whole of the array of data elements.

However, as will be seen below, the two-dimensional array of data values may itself be divided into smaller regions when producing the two one-dimensional arrays of data values as this may help to provide a better approximation of the two-dimensional array.

The two-dimensional array may be generated at any suitable and desired resolution, e.g. compared to the resolution of the array of data elements. In one embodiment the two-dimensional array is generated at the same resolution as the array of data elements and thus each data value of the two-dimensional array represents one or more properties of an individual (e.g. the corresponding) data element of the array of data elements (e.g. for each pixel of a frame of video image data).

In other embodiments the two-dimensional array is generated at a coarser resolution than the array of data elements. Thus each data value of the two-dimensional array may correspond to plural (e.g. groups of) data elements of the array of data elements. The plural data elements may be grouped together in any suitable and desired way, e.g. in blocks of data elements. For example, each data value of the two-dimensional array may correspond to a block of 16×16, or 64×64, data elements of the array of data elements. These blocks may, in some embodiments, correspond to the blocks into which the array of data elements is divided for the purposes of encoding.

Thus the array of data elements may be analysed (e.g. sampled) at the required resolution (e.g. at the level of each data element or block of data elements) to generate the two-dimensional array of data values representing the distribution of the one or more properties of the data elements.

The processing circuitry which (e.g. analyses the data elements of the array and) generates the two-dimensional array of data values may be any suitable and desired processing circuitry (e.g. stage or processor) of the apparatus. When the apparatus comprises a video processing apparatus (for encoding frames of video image data), the encoding circuitry (e.g. the video encoder itself) may generate the two-dimensional array of data values, e.g. as part of the process of encoding the frame of video image data. In another embodiment an image signal processor or graphics processing unit (e.g. the processor that generates the frames of video image data) is operable to generate the two-dimensional array of data values.

The two-dimensional array of data values may represent any suitable any desired property or properties of at least some of the data elements of the array of data elements, e.g. properties which may be generated or used when encoding array(s) in the stream of arrays of data elements.

In one embodiment the one or more properties (e.g. when the arrays of data elements comprise frames of video image data) comprises the intensity or brightness (e.g. luma or relative luminance) of the data elements of the array. This may be used, for example, to assess the contrast in a frame of video image data, and can be useful for high dynamic range (HDR) video, imaging and/or rendering.

In one embodiment the one or more properties (e.g. when the arrays of data elements comprise frames of video image data) comprises the complexity (level of detail) of the data elements of the array. The complexity of the data elements of the array could be assessed for the array of data elements as a whole (e.g. returning (only) a single data value representative of the complexity of the array of data elements).

However, in one set of embodiments, the complexity of the data elements of the array is assessed for each of plural (e.g. distinct) regions of the array of data elements, wherein each region corresponds to a plurality of data elements of the array of data elements. Thus, when the two-dimensional array of data values represents the complexity of the regions of the array of data elements, in one set of embodiments the two-dimensional array comprises data values at a resolution of (only) a single data value for each region of the array of data elements (i.e. with the data values of the two-dimensional array representing the complexity of the respective regions of the array of data elements).

The representation of the complexity distribution in the two-dimensional array of data values allows, for example, differences in complexity between different regions of an array of data elements or between different arrays in the sequence of arrays of data elements to be evaluated, e.g. for use in the encoding of the array(s) of data elements. The regions over which the complexity of the data elements in the array is assessed may (but do not necessarily) correspond to the blocks of the array of data elements (in the embodiments in which the array of data elements is divided into plural blocks for the purposes of encoding).

The complexity of the data elements of the (e.g. region of the) array may be quantified (and thus represented by the data values of the two-dimensional array) in any suitable and desired way. In one embodiment the complexity of a plurality of data elements of (e.g. a region of) the array of data elements is represented by the variance of a plurality of data values (e.g. representing a particular variable) associated with the plurality of data elements of (e.g. the region of) the array of data elements. This variance helps to provide a quantifiable measure of the level of detail of the (e.g. region of the) array of data elements.

In one embodiment the complexity of a plurality of data elements of (e.g. a region of) the array of data elements is represented by the (e.g. estimated) number of encoded bits spent per data element or region (e.g. block for encoding) of the array of data elements. The number of bits spent when encoding a particular data element or region of an array of data elements may be indicative of the complexity of the (e.g. region of the) array of data elements.

The number of bits spent encoding information may also help the encoding circuitry, for example, when encoding the next array of data elements in the stream, to know in advance that a particular region of the array of data elements may result in very few bits when encoded (e.g. owing to a low level of complexity in the region) whereas other regions may result in a greater number of bits (e.g. owing to a higher level of complexity in these regions). This may be useful, for example, when the encoding circuitry comprises rate controlling circuitry and when a target data rate (amount of bits) is being aimed for, for encoding the whole array of data elements. The array of data elements may then be encoded accordingly, using the number of bits spent encoding information, in order to achieve this rate.

In one embodiment the one or more properties (e.g. when the arrays of data elements comprise frames of video image data) comprises the amount of change (e.g. movement) of the data elements of the array between (e.g. successive) arrays in the stream of arrays. The amount of change (e.g. movement) of the data elements may be represented by the respective motion vectors (e.g. the magnitude of the x and y components, or the absolute magnitude thereof) of the data elements of the array.

Motion vectors, which may be generated during the encoding of an array of data elements, help to indicate by how much an array of data elements is changing compared to the previous or next array in the stream of arrays. This indication may be used by a motion search engine to locate the corresponding data elements in another array in the stream, e.g. for encoding these data elements relative to those in the current array.

The amount of change (e.g. movement) of the data elements of the array (e.g. represented by motion vectors) may be provided for an array as a whole (i.e. globally) or for regions (e.g. encoding blocks) of an array (i.e. locally).

In one embodiment the one or more properties (e.g. when the arrays of data elements comprise frames of video image data) comprises the type (e.g. mode) of encoded (e.g. block of the) array that the array of data elements being encoded is (or has been) encoded as, such as an inter, intra or skip mode of encoding the (e.g. block of the) array. The type of encoding helps to give an indication about how much an (e.g. block of an) array of data elements differs from a previous (e.g. block of an) array in the stream of arrays, because, for example, it indicates how an (e.g. block of an) array of data elements has been encoded relative to a previous array, if at all. The type of encoding may also help to indicate, for frames of video image data, when large objects are moving across parts of the frame, owing to the type of encoding being used for different blocks of the frame.

When encoding frames of video image data, for example, the (e.g. blocks of) frames may be encoded relative to other (e.g. blocks of) frames in the stream of frames, e.g. adjacent frames in the stream. Such encoded (e.g. blocks of) frames are known as "inter" blocks or frames.

The (e.g. blocks of) frames may alternatively be encoded as an isolated frame with, for example, the encoding exploiting any spatial redundancy in the frame. Such encoded (e.g. blocks of) frames are known as "intra" blocks or frames.

The blocks of a frame may be encoded as a "skip" block, where no encoded data is generated for the block (other than to indicate that the block is a "skip" block). When a "skip" block is decoded, the decoder then uses and relies upon the encoding (e.g. motion vectors) of adjacent blocks to estimate the motion vectors of the "skip" block.

In one set of embodiments, the type of encoding (e.g. to be) used for a block or array of data elements is represented in the two-dimensional array of data values by a respective (e.g. integer) code. For example, the data value "2" may be used to indicate an intra block or frame, "1" may be used to indicate an inter block or frame, and "0" may be used to indicate a skip block.

When plural properties, or a property having plural values for each data element (e.g. a multivalued function such as a motion vector), are to be represented by the data values of the two-dimensional array, in one set of embodiments the method comprises generating a plurality of two-dimensional arrays of data values from the array of data elements, wherein the data values in each of the two-dimensional array of data values are representative of a respective (e.g. component of a) property of at least some of the data elements in the array of data elements.

Taking the motion vectors as an example, a separate two-dimensional array of data values may be generated for each component (x and y) of the motion vector. (Alternatively, as outlined above, the data values of the two-dimensional array may represent the absolute magnitude of the motion vectors.)

When a plurality of two-dimensional arrays of data values are generated from the array of data elements, in one set of embodiments a plurality of pairs of one-dimensional arrays of data values (e.g. two one-dimensional arrays for each two-dimensional array) are produced, to approximate the two-dimensional arrays.

The two one-dimensional arrays of data values may be produced from the two-dimensional array of data values, such that the data values of the two one-dimensional arrays of data values are representative of the data values along the two dimensions of the two-dimensional array of data values respectively, in any suitable and desired way. In one set of embodiments, for a two-dimensional array whose data values represent a two-dimensional statistical distribution $f(x, y)$, the two one-dimensional arrays of data values comprise respective one-dimensional statistical distributions $a(x)$ and $b(y)$. In one set of embodiments, the two one-dimensional arrays of data values (e.g. the two one-dimensional statistical distributions) are produced by factorising the two-dimensional array of data values (e.g. the two-dimensional statistical distribution). In one set of embodiments, the two-dimensional array of data values is factorised to produce the two one-dimensional arrays of values in a way such that $f(x,y) \approx a(x)b(y)$.

Thus the one-dimensional array of data values, $a(x)$, represents the distribution of data values of the two-dimensional array along the x-axis, while the other one-dimensional array of data values, $b(y)$, represents the distribution of data values of the two-dimensional array along the y-axis. In one set of embodiments, the two directions, along which the two one-dimensional arrays represent the data values from the two-dimensional array, are orthogonal to each other. Thus when the two-dimensional array of data values comprises a rectangular array (e.g. generated from a rectangular array of data elements), from which the two one-dimensional arrays are produced, in one set of embodiments the directions along which the two-one dimensional arrays represent the data values from the two-dimensional array correspond to the two main (e.g. x and y) axes of the two-dimensional array of data values (and thus, e.g., also to the two main (e.g. x and y) axes of the array of data elements).

In one embodiment the two-one dimensional arrays of data values are produced by integrating (e.g. summing) the data values of two-dimensional array (e.g. in a direction orthogonal to direction of the one-dimensional array), for each set of data values along the direction of the one-dimensional array. Thus, in one set of embodiments:

$a(x)=\Sigma_y f(x,y)$ $b(y)=\Sigma_x f(x,y)$

The (e.g. number of) data values in the two one-dimensional arrays may correspond to the (e.g. number of) data values in the two-dimensional array in any suitable and desired way. In one embodiment the data values in the two one-dimensional arrays are produced at the same resolution as the data values in the two-dimensional array. Thus, in one embodiment, the number of data values in the one-dimensional arrays is equal to the number of data values in the two-dimensional array along the respective directions that the two one-dimensional arrays represent the data values of the two-dimensional array. For example, when the two-dimensional array is an n by m sized array, the two one-dimensional arrays may be of size n data values and m data values respectively.

It will be seen that by factorising the two-dimensional array into two one-dimensional arrays in this way, the amount of memory needed to store $a(x)$ (e.g. containing n data values) and $b(y)$ (e.g. containing m data values) is less than the amount of (because n+m n·m, and this disparity gets wider as n and m increase).

However, in one embodiment, the two one-dimensional arrays may not represent the data values from the two-dimensional array in as fine detail. This may help to save memory space when storing the two one-dimensional arrays. For example, the data values of the two-dimensional array may be sampled (or averaged) at a coarser resolution than the resolution of the data values of the two-dimensional array to produce the two one-dimensional arrays. Thus, when the two-dimensional array is an n by m sized array, the two one-dimensional arrays may have fewer than n and m data values respectively.

The two one-dimensional arrays of data values may represent the whole of the two-dimensional array of data values. For example, only two one-dimensional arrays may be produced (e.g. for each property of the array of data elements being represented) to represent the data values of the two-dimensional array.

However, in one embodiment, the method comprises (and the processing circuitry is operable to) producing two one-dimensional arrays of data values for each of plural (e.g. distinct) regions of the two-dimensional array of data values. Thus, in one set of embodiments, the method comprises (and the processing circuitry is operable to) dividing the two-dimensional array of data values into a plurality of regions and producing a respective plurality of pairs of one-dimensional arrays of data values to represent the data values along the two dimensions of the plurality of regions of the two-dimensional array respectively. It will be appreciated that approximating the two-dimensional array using plural pairs of one-dimensional arrays of data values may help to represent the data values of the two-dimensional array more accurately while still resulting in a reduction in memory usage.

The two-dimensional array of data values may be divided into any suitable and desired number of regions, e.g. corresponding to the blocks that the array of data elements is divided into for the purposes of encoding the array of data elements. However, in one set of embodiments, the regions do not correspond to the encoding blocks and, for example, are larger than the encoding blocks (when provided). In one embodiment the two-dimensional array of data values is divided into nine (e.g. rectangular) regions (e.g. 3×3) and a pair of one-dimensional arrays is produced for each region of the two-dimensional array.

The processing circuitry which (e.g. uses the data values of the two-dimensional array and) produces the two one-dimensional arrays of data values may be any suitable and desired processing circuitry (e.g. stage or processor) of the apparatus. This may be (but is not necessarily) the same processing circuitry as for generating the two-dimensional array of data values.

When the apparatus comprises a video processing apparatus (for encoding frames of video image data), the encoding circuitry (e.g. the video encoder itself) may produce the two one-dimensional arrays of data values, e.g. as part of the process of encoding the frame of video image data (and, e.g., as part of the process of generating the two-dimensional array of data values). In another embodiment an image signal processor or graphics processing unit (e.g. the processor that generates the frames of video image data and, e.g., generates the two-dimensional array of data values) is operable to produce the two one-dimensional arrays of data values.

The statistical data may be generated for (e.g. each of) plural (e.g. successive) arrays of data elements in the stream of arrays. Owing to arrays of data elements being processed and encoded individually (and not in batches), in one set of embodiments the statistical data is generated in a (separate) two-dimensional array for (e.g. each) array of data elements in the stream to be encoded.

In another embodiment (e.g. to exploit redundancy between successive arrays of data elements in the stream of arrays) the method comprises (and the processing circuitry is operable to) generating a three-dimensional array of data values representative of one or more properties associated with the data elements of the plural arrays. Thus, in one set of embodiments, the three-dimensional array of data values comprises the two-dimensional array of other embodiments but with a third "time" dimension. This may help to analyse how the distributions of statistical data change over time in the stream of data arrays, e.g. for tracking large moving objects, varying brightness or a level of detail (e.g. complexity) over time.

When a three-dimensional array of data values is generated, in one set of embodiments, three one-dimensional arrays of data values are produced from the three-dimensional array of data values, e.g. the statistical distribution function $f(x,y,z)$ may be factorised into $f(x,y,z) \approx a(x)b(y)c(z)$, where $c(z)$ is the one-dimensional array in the "time" direction (or in the direction between arrays in the stream of arrays of data elements).

Having produced and stored the two one-dimensional arrays of data elements, these one-dimensional arrays may then be used to approximate one or more of the data values in the two-dimensional array of data values, when encoding an array of data elements in the stream of arrays being encoded. The two one-dimensional arrays of data elements may be used to approximate (e.g. reconstruct) the data values in the two-dimensional array of data values in any suitable and desired way, by using the appropriate data elements of the two one-dimensional arrays to approximate a data value of the two-dimensional array.

In one embodiment a data value in the two-dimensional array of data values is approximated by multiplying together the data values of the two one-dimensional arrays corresponding to the row and column of the data value to be approximated in the two one-dimensional arrays of data elements, and, e.g., by dividing them by the sum of all of the data values of the two-dimensional array. Thus, in one set of embodiments:

$$f_{approx}(x, y) = \frac{a(x)b(y)}{\sum_x \sum_y f(x, y)}$$

where $f_{approx}(x,y)$ is the data value in the approximation of the two-dimensional array.

As will be seen, this approximation requires knowledge of the data values of the two-dimensional array, which, e.g., are not stored, to determine the double sum in the denominator. However, the sum is only a single value for the whole of the two-dimensional array (or a value for each region into which the two-dimensional array has been divided to produce the two one-dimensional arrays for each region), which is the same for all of the data values to be approximated. Thus, in one set of embodiments, the sum of all of the data values of the two-dimensional array is calculated when generating the two-dimensional array of data values or when producing the two one-dimensional arrays of data values, and, e.g., stored. This then allows approximate values of the two-dimensional array to be reconstructed from the data values of the two one-dimensional arrays.

In some embodiments, however, a data value in the two-dimensional array of data values may be approximated simply by multiplying together the data values of the two one-dimensional arrays corresponding to the row and column of the data value to be approximated in the two one-dimensional arrays of data elements, and not, for example, dividing by the sum of all of the data values of the two-dimensional array. This may be appropriate, for example, when changes between different arrays in the stream are desired to be tracked. Thus, in these embodiments, it may not be necessary to calculate the sum of all of the data values of the two-dimensional array.

The sum of all of the data values of the two-dimensional array may be calculated in any suitable and desired way. In one embodiment the sum is calculated by accumulating the data values of the two-dimensional array as they are generated from the array of data elements, e.g. as part of the step of generating the two-dimensional array of data values.

When the two-dimensional array of data values has been divided into plural regions to produce plural respective pairs of one-dimensional arrays of data values, in one set of embodiments, a data value of the two-dimensional array is approximated by using the pair of one-dimensional arrays of data values and the sum of all of the data values for the appropriate region of the two-dimensional array (i.e. the region in which the data value to be approximated lies). To enable the approximation of the data values across all of the two-dimensional array, in one set of embodiments, the sum of all of the data values of each region of the two-dimensional array is calculated (e.g. accumulated when the two-dimensional array is being generated) and stored.

In one set of embodiments, a particular data value of the two-dimensional array is approximated from the two one-dimensional arrays of data values on demand, e.g. when the (approximation of the) particular data value of the two-dimensional array is required for encoding an array of data elements in the stream of arrays. This helps to reduce the processing and memory required for calculating and storing the approximated data values of the two-dimensional array because the entire two-dimensional array does not need to be reconstructed. Thus, particular approximate data values of the two-dimensional array may be calculated (e.g. in turn) when required (by the encoding circuitry) for the encoding of an array of data elements, e.g. for encoding a particular position or block of positions in the array.

In one set of embodiments, the reconstructed approximate data values of the two-dimensional array are stored (e.g. temporarily), such that they are available should they be required again for the encoding of other elements of the array of data elements or for other array(s).

The reconstructed approximate data values of the two-dimensional array may be used in the encoding of the same array of data elements of which the data values of the two-dimensional array are representative. Thus, in one embodiment the method comprises (and the encoding circuitry is operable to) using the approximated data value(s) of the two-dimensional array of data values when encoding the same array of data elements from which the original data values of the two-dimensional array were generated.

The reconstructed approximate data values of the two-dimensional array may also (e.g. alternatively) be used in the encoding of subsequent array(s) of data elements in the stream of arrays. Thus, in other embodiments, the method comprises (and the encoding circuitry is operable to) using the approximated data value(s) of the two-dimensional array of data values when encoding one or more subsequent array of data elements (i.e. subsequent to the array of data elements from which the original data values of the two-dimensional array were generated) in the stream of arrays of data elements to be encoded.

The reconstructed approximate data values of the two-dimensional array may be used in the encoding of the array of data elements (i.e. from which the two-dimensional array of data elements was generated), or in the encoding of one or more subsequent arrays of data elements in the stream, in any suitable and desired way. This allows the encoding of the arrays of data elements to be based on the (approximated values for the) one or more properties of the data elements that the two-dimensional array(s) of data values represent. Furthermore, it allows the encoding process to be varied (e.g. in a customised manner) from array to array of data elements in the stream of arrays to be encoded.

In one set of embodiments, the method comprises (and the encoding circuitry is operable to) controlling the encoding of the array of data elements or one or more subsequent arrays of data elements in the stream of arrays of data elements to be encoded using (based on) the one or more approximated data values of the two-dimensional array of data values.

The encoding of the array of data elements or of the one or more subsequent arrays of data elements, may be controlled in any suitable and desired way using the one or more approximated data values of the two-dimensional array of data values. In one embodiment the step of controlling comprises taking an encoding decision in the encoding of the array of data elements or of the one or more subsequent arrays of data elements based on the one or more approximated data values of the two-dimensional array of data values (and then, in one set of embodiments, encoding the array of data elements or the one or more subsequent arrays of data elements according to the encoding decision).

Such a decision may, for example, comprise selecting between two or more options as to how (e.g. a block of) the array of data elements or of the one or more subsequent arrays of data elements are to be encoded. This helps to make (e.g. optimal) encoding decisions in order, for example, to optimise the visual quality of frames of video image data (e.g. when decoded) for the number of bits output in the encoded bitstream. These encoding decisions may also help to fine-tune the encoding of a frame of video image data for different regions in the image, e.g. such as text, faces, sky, grass, etc. This fine-tuning may, for example, depend on other variables in the different regions of the frames of video image data, such as the light intensity.

The encoding options to be selected from may be for a particular block (e.g. having a particular size in terms of data elements of the frame) and/or may include, for example, particular motion vectors and/or a particular encoding mode (intra, inter, skip, forward, backward, uni-directional, bi-directional, merge, etc. mode) used to derive the reference array or block, e.g. for a particular block.

When the array of data elements or the one or more subsequent arrays of data elements is being encoded in a block-wise fashion, the encoding decision (e.g. selecting between encoding options) may be taken for blocks individually (and, e.g., independently). In one set of embodiments, the blocks are then encoded according to their respective encoding decisions. This allows the encoding of an array of data elements that has been divided into blocks to be varied (e.g. in a customised manner) for the different blocks of data elements in the array being encoded.

The encoding of the array of data elements or of the one or more subsequent arrays of data elements may use the approximate reconstructed data value(s) of only a single two-dimensional array of data values, which may, e.g., represent only a single property of the array of data elements. However, in some embodiments the encoding of the array of data elements or of the one or more subsequent arrays of data elements may use the approximate reconstructed data values of plural two-dimensional arrays of data values, which, e.g., represent plural properties of the array of data elements.

In a similar manner, the encoding of the array of data elements or of the one or more subsequent arrays of data elements may use the approximate reconstructed data value(s) of one or more two-dimensional arrays of data values that have been generated from only a single array of data elements. However, in some embodiments the encoding of the array of data elements or of the one or more subsequent arrays of data elements may use the approximate reconstructed data values of plural two-dimensional arrays of data values that have been generated from plural arrays of data elements respectively. It will be appreciated that this may be useful when encoding (e.g. a block of) an array of data elements relative to plural other (e.g. blocks of) arrays of data elements.

The use of plural two-dimensional arrays of data values that have been generated from plural arrays of data elements respectively in the encoding of the array of data elements or of the one or more subsequent arrays of data elements may, for example, be combined with the above embodiments such that plural two-dimensional arrays of data values, which, e.g., represent plural properties of the array of data elements, that have been generated from plural arrays of data elements, are used in the encoding of the array of data elements or of the one or more subsequent arrays of data elements.

When the two-dimensional array of data values is generated from an array of data elements being encoded and the reconstructed approximate data values of this two-dimensional array are used in the encoding of the same array of data elements, the generation of the two-dimensional array of data values may be performed as a first pass before a further pass that uses the reconstructed approximate data values of this two-dimensional array, e.g. to make encoding decisions for the encoding of the array of data elements.

In the embodiments that comprise selecting a set of encoding options to use when encoding (e.g. a block of) an array of data elements, the step of selecting the encoding options may be followed by performing an encoding process that encodes the (e.g. block of the) array in accordance with the selected set of encoding options. Thus, the (e.g. data processing) apparatus may comprise processing circuitry configured to perform an encoding process that encodes the (e.g. block of the) array in accordance with the selected set of encoding options.

The encoding process may comprise, when the particular set of encoding options is selected for use when encoding (e.g. a block of) an array of data elements, encoding the (e.g. block of the) array in accordance with the selected particular set of encoding options. Alternatively, the encoding process may comprise, when the particular set of encoding options is not selected for use when encoding (e.g. a block of) an array, not encoding the (e.g. block of the) array in accordance with the particular set of encoding options. In this case, the (e.g. block of the) array of data elements may be encoded in accordance with a selected different set of encoding options.

The encoding process can take any desired and suitable form. The encoding process may be defined by the standard (e.g. MPEG standard) to be used when encoding the array of data elements. In embodiments, the encoding process may comprise entropy encoding.

As will be appreciated, the encoding process may comprise generating a set of difference values that represents the difference between (e.g. a source block of) a source array and (e.g. a reference block of) a reference array for a selected set of encoding options, generating a set of frequency domain coefficients for the set of difference values by applying a (e.g. complete) forward transformation process to the set of difference values, and/or generating a set of quantised coefficients by applying a (e.g. complete) quantisation process to the set of frequency domain coefficients. The (e.g. entropy) encoding may then be performed on the set of quantised coefficients.

As will be appreciated, any of the processes that are performed in respect of a source block that corresponds to a region of an array may, in practice, be performed respectively for each (e.g. every) one of plural source blocks that correspond to the region or that correspond respectively to plural (different) regions of the array.

As will also be appreciated, any of the processes that are performed in respect of an array may, in practice, be performed respectively for each (e.g. every) one of plural arrays of the stream of arrays.

In any of the embodiments described herein, once encoded, the encoded block(s) and/or encoded array and/or encoded stream of arrays may be used in any desired and suitable way. For example, the encoded block(s) and/or encoded array and/or encoded stream of arrays may be output, e.g. stored in memory and/or streamed to another device. Thus, the (e.g. data processing) apparatus may comprise output circuitry (e.g. write out circuitry) configured to output (e.g. write out) the encoded block(s) and/or encoded array and/or encoded stream of arrays, e.g. to memory or to another device. The one or more motion vectors, when used, may also be output in a similar way.

The encoded block(s) and/or encoded array and/or encoded stream of arrays may later be retrieved and/or received, e.g. for decoding. Thus, the (e.g. data processing) apparatus may comprise input circuitry (e.g. read in circuitry) configured to input (e.g. read in) the encoded block (s) and/or encoded array and/or encoded stream of arrays, e.g. from memory. The one or more motion vectors, when used, may also be input in a similar way.

Encoding (e.g. a block of) an array may be followed by a decoding process that decodes the encoded (e.g. block of the) array. Thus, the (e.g. data processing) apparatus may comprise processing circuitry configured to perform a decoding process that decodes an encoded (e.g. block of an) array. The decoding process can take any desired and suitable form, for example that corresponds to the encoding process that was used when encoding the encoded (e.g. block of the) array. The decoding process may be defined by the standard (e.g. MPEG standard) that was used when encoding the array of data elements. For example, the decoding process may comprise entropy decoding.

In any of the embodiments described herein, once determined, the data elements of the decoded (e.g. block of the) array may be used in any desired and suitable way.

For example, the data elements of the decoded (e.g. block of the) array may be output (e.g. by an output (e.g. display) processor), e.g. for display. In these embodiments, the arrays of data elements may correspond to images, e.g. frames of image data, and the data elements may correspond to a pixel or pixels.

The processes described herein in any embodiment may be performed by any desired and suitable apparatus. For example, the processes described herein in any embodiment may be performed by a video processor (codec). The (e.g. data processing) apparatus described herein in any embodiment may therefore comprise or may be a video processor. Thus, the encoding circuitry, processing circuitry, output circuitry or write out circuitry, input circuitry or read in circuitry, etc. described herein in any embodiment may form part of a video processor. The data processing apparatus described herein in any embodiment may comprise, or may be, or may form part of, a system on chip (SoC).

The memory referred to herein may be any desired and suitable memory of or for the (e.g. data processing) apparatus. The memory may be external to the data processing apparatus, e.g. video processor and/or system on chip (SoC). The memory may be, for example, main system memory.

The technology described herein can be used for all forms of data arrays that a data processing apparatus may provide and/or use, such as images or frames for display. Thus, as indicated above, the arrays of data elements may comprise image data and/or may correspond to images or frames of image data.

In an embodiment, the various functions of the technology described herein are carried out on a single data (e.g. image) processing platform that provides and/or uses the arrays of data elements.

As will be appreciated by those skilled in the art, the (e.g. data processing) apparatus of the technology described herein may be part of an overall data processing system that includes, for example, a host (e.g. central) processor. The host processor may, for example, execute applications that require data processing by the (e.g. data processing) apparatus. The host processor may send appropriate commands and data to the (e.g. data processing) apparatus to control it to perform the data processing operations and to generate and/or use an output required by applications executing on the host processor. To facilitate this, the host processor may execute a driver for the (e.g. data processing) apparatus and/or may execute a compiler or compilers for compiling programs to be executed by a programmable execution unit of the (e.g. data processing) apparatus.

In embodiments, the apparatus or system may comprise, and/or may be in communication with, one or more memories and/or memory devices that store the data described herein, and/or store software for performing the processes described herein. The apparatus or system may comprise, and/or may be in communication with a display for displaying images based on the data elements of the arrays. The apparatus or system may comprise, and/or may be in communication with a video camera that generates the arrays of data elements.

The technology described herein can be implemented in any suitable system, such as a suitably configured computer or micro-processor based system. In one embodiment, the technology described herein is implemented in a computer and/or micro-processor based system.

The various functions of the technology described herein can be carried out in any desired and suitable manner. For example, the steps and functions of the technology described herein can be implemented in hardware or software, as desired. Thus, for example, unless otherwise indicated, the various circuitry, functional elements, stages and "means" of the technology described herein may comprise a suitable processor or processors, controller or controllers, functional units, circuitry, processing logic, microprocessor arrangements, etc., that are operable to perform the various steps or functions, etc., such as appropriately dedicated hardware elements (processing circuitry) and/or programmable hardware elements (processing circuitry) that can be programmed to operate in the desired manner.

The various steps or functions, etc., of the technology described herein may be duplicated and/or carried out in parallel on a given processor. Equally, the various processing stages may share processing circuitry, etc., when desired.

Subject to any hardware necessary to carry out the specific steps or functions, etc., discussed above, the system can otherwise include any one or more or all of the usual functional units, etc., that data processing apparatus and/or systems include.

The various data processing stages can accordingly be implemented as desired and in any suitable manner, and can perform any desired and suitable functions, respectively. Similarly, the various data can be defined and stored in any suitable and desired manner.

It will also be appreciated by those skilled in the art that all of the described embodiments of the technology described herein can, and in an embodiment do, include, as appropriate, any one or more or all of the features described herein.

The methods of the technology described herein may be implemented at least partially using software e.g. computer programs. Thus, further embodiments the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein also extends to a computer software carrier comprising such software which when used to operate a data processing apparatus or system comprising a data processor causes in conjunction with said data processor said apparatus or system to carry out the steps of the methods of the technology described herein. Such a computer software carrier could be a physical storage medium such as a ROM chip, CD ROM, RAM, flash memory, or disk.

It will further be appreciated that not all steps of the methods of the technology described herein need be carried out by computer software and thus in further embodiments comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable storage medium, for example, diskette, CD, DVD, ROM, RAM, flash memory, or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

The drawings show elements of a data processing apparatus and system that are relevant to embodiments of the technology described herein. As will be appreciated by those skilled in the art there may be other elements of the data processing apparatus and system that are not illustrated in the drawings. It should also be noted here that the drawings are only schematic, and that, for example, in practice the shown elements may share significant hardware circuits, even though they are shown schematically as separate elements in the drawings.

As discussed above, embodiments of the technology described herein relate to encoding arrays of data elements. Various embodiments of the technology described herein will now be described in the context of the encoding frames of image data for display. However, the concepts described herein can equally be applied to contexts in which arrays of other types of data are to be encoded.

FIG. 1 shows schematically an embodiment of a data processing system 1 that can provide and use data arrays, such as frames for display, that have been encoded in the manner of the present embodiments.

In this embodiment, the system 1 comprises a data processing apparatus in the form of a system on chip (SoC) 2. The system 1 also comprises off-chip (main) memory 16, a display device 18 and a video camera 20.

The SoC 2 comprises a central processing unit (CPU) 4, a graphics processing unit (GPU) 6, a video processor 8, a display controller 10, an interconnect 12 and a memory controller 14. The video processor 8 includes a bitstream encoder 9.

s is shown in FIG. 1, the CPU 4, GPU 6, video processor 8 and display controller 10 communicate with each other via the interconnect 12 and with the memory 16 via the interconnect 12 and memory controller 14. The display controller 10 also communicates with the display device 18. The video camera 20 also communicates with the SoC 2 via the interconnect 12.

In the following embodiments, the video processor 8 reads in image data from memory 16, the bitstream encoder 9 of the video processor 8 encodes the image data, and then outputs the bitstream of encoded image data, e.g. for storage in memory 16 or for streaming to another device. The encoded image data can later be retrieved and decoded, e.g. by the video processor 8, or received and decoded by another device. The decoded image data can then be output, e.g. by the display controller 10 to the display device 18 or by another device, for display.

In these embodiments, a current "source" frame to be encoded can be provided to the video processor 8 from the memory 16, via the interconnect 12 and the memory controller 14. In a similar manner, one or more previous and/or subsequent "reference" frames that may be used when encoding the source frame, can be provided to the bitstream encoder 9 of the video processor 8 from the memory 16, via the interconnect 12 and the memory controller 14.

In these embodiments, the source frame is divided into plural source blocks to be encoded on a block by block basis. Each source block is initially 16×16 data elements (pixels) in size. Each source block can, however, be further divided into two 16×8 or 8×16 source blocks or four 8×8 source blocks, if that would provide for less costly encoding, for example. Each of these smaller source blocks can also be further divided into two 8×4 or 4×8 source blocks or four 4×4 source blocks, if again that would provide for less costly encoding, for example. Other source block sizes could of course be used as desired.

In these embodiments, a source block can be encoded in one of a number of different modes, e.g. to be determined by the bitstream encoder 9 of the video processor 9 depending on the nature of the source block and frame. In one mode, a source block is encoded using another block within the source frame itself, i.e. using "intra" mode encoding that exploits redundancies in the frame, for example.

Also in these embodiments, the one or more reference frames are divided into plural blocks (which may correspond in size to the source block) that may be used when encoding the source frame, i.e. using "inter" mode encoding. This mode of encoding may encode the source frame relative to the reference frame(s) using motion vectors that describe how a particular source block of a particular source frame is mapped (e.g. by translation, rotation and/or scaling) to the reference blocks.

Another mode, inter alia, which may be used in these embodiments is the "skip" mode in which blocks of a source frame are not encoded relative to corresponding blocks of one or more reference frames (and so no encoded data is generated for the source block, other than an indication that the block is a "skip" block). Instead a "skip" block is decoded by using and relying upon the encoding (e.g. motion vectors) of adjacent blocks to estimate the motion vectors of the "skip" block.

An encoding process in which the video processor 8 encodes an array of data elements of a stream of arrays of data elements, such as a stream of frames of image data, will now be described in more detail with reference to FIGS. 2, 3, 4a and 4b.

Figure 2:
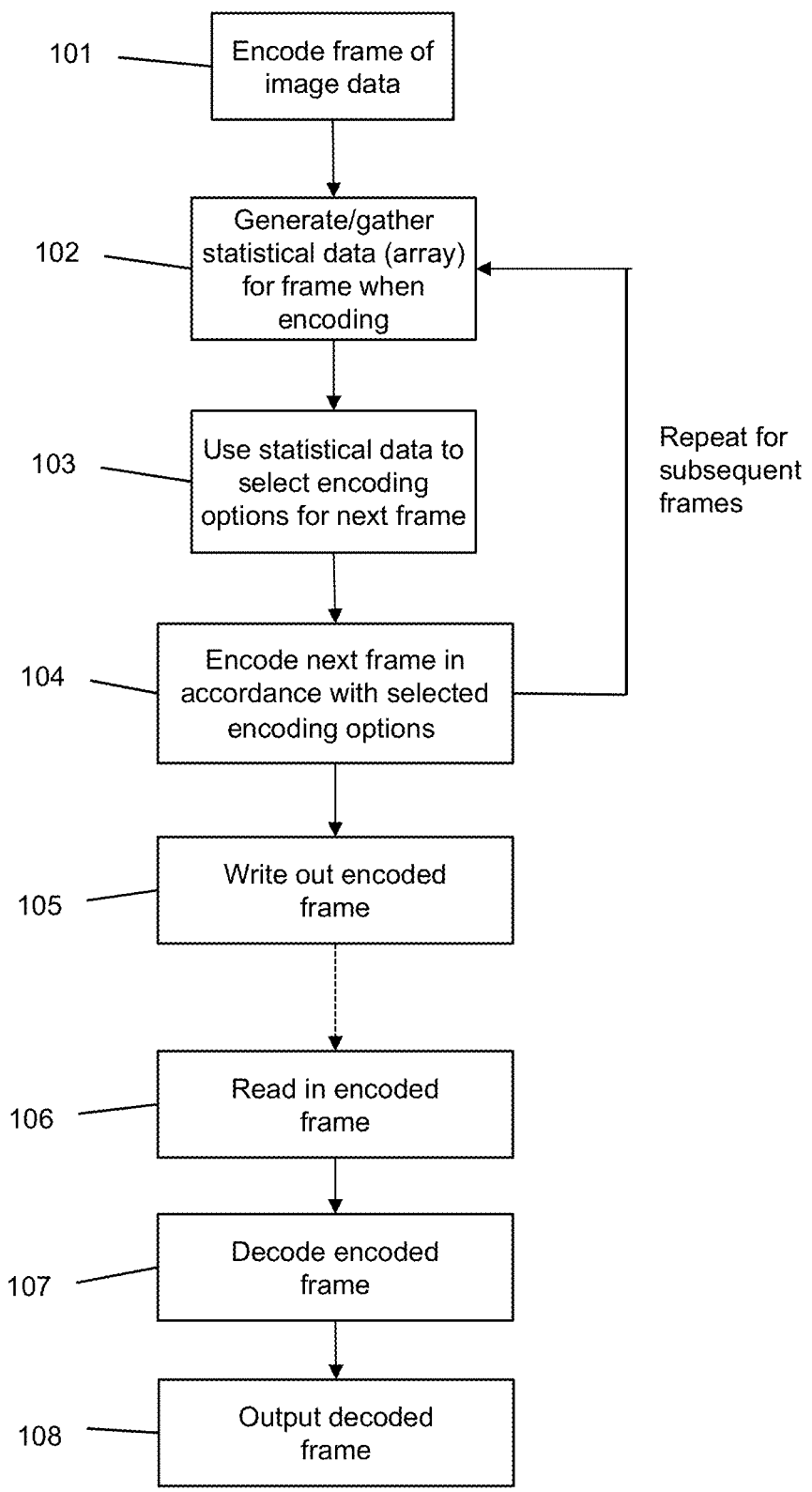
FIG. 2 shows a flow chart detailing the steps for encoding a stream of frames of image data in accordance with an embodiment of the technology described herein.
Figure 3:
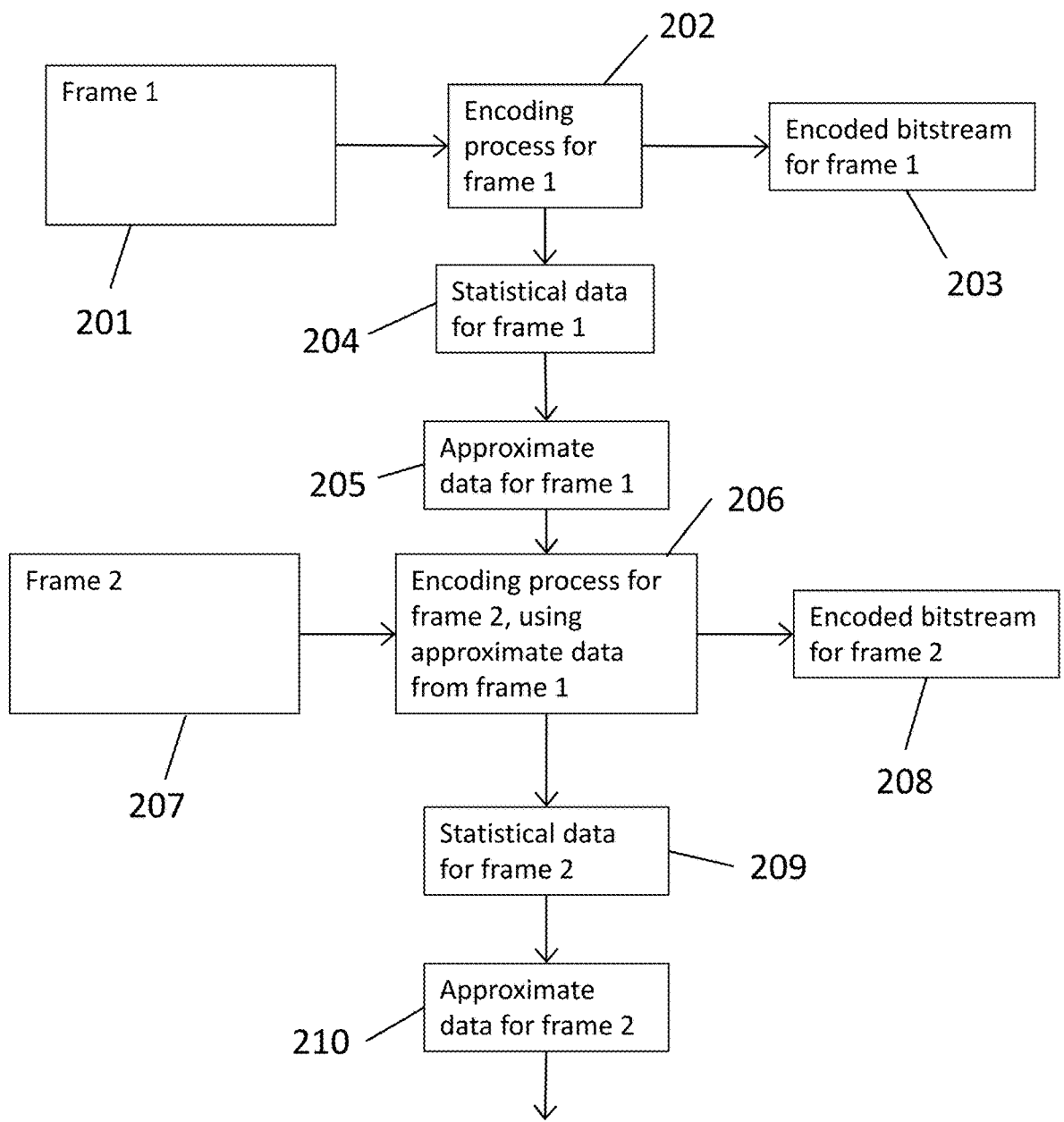
FIG. 3 shows the encoding data flows schematically for two frames of video image data being encoded in an embodiment of the technology described herein.
Figure 4A:
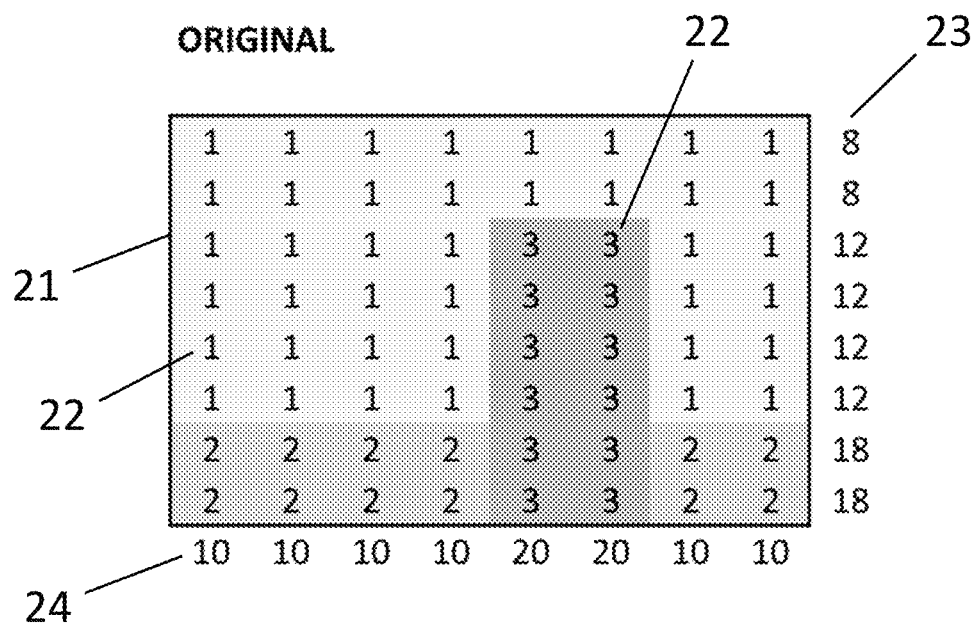
FIG. 4a shows an example of a two-dimensional array of statistical data that is generated in the encoding of a frame of video image data in accordance with an embodiment of the technology described herein.
Figure 4B:
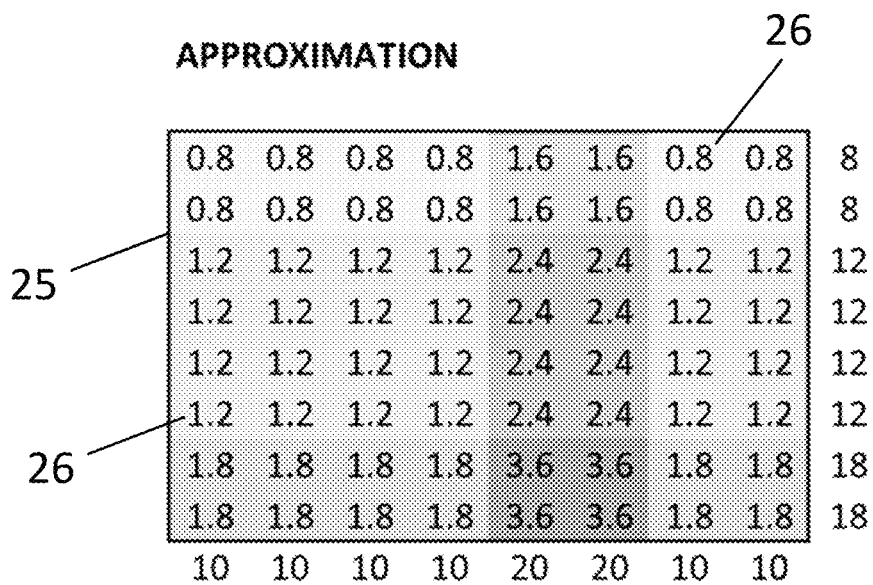
FIG. 4b shows a reconstructed two-dimensional array of approximate data values that is generated in an embodiment of the technology described herein.

FIG. 2 shows a flow chart detailing the steps for encoding a stream of frames of image data in which encoding options, for how to encode a frame, are selected dependent on statistical data that is gathered when encoding a previous frame. FIG. 3 shows the encoding data flows schematically for two frames of video image data being encoded in an embodiment of the technology described herein. FIGS. 4a and 4b show an example of a two-dimensional array (and its reconstructed approximation) of statistical data that is generated in the encoding of a frame of video image data in accordance with an embodiment of the technology described herein.

The video processor 8 is used to encode a frame of video image data in a sequence of frames of video image data (step 101, FIG. 2). When the frame of video image data is being encoded (e.g. relative to a previous frame in the sequence of frames), a two-dimensional array of statistical data for the frame is gathered by video processor 8 (step 102, FIG. 2).

Such statistical data, which represents one or more properties of the frame being encoded, may, inter alia, include one or more of the intensity of the blocks or pixels of the frame, the complexity of the blocks of the frame, the movement of the blocks or pixels of the frame relative to the respective blocks or pixels of a previous (or subsequent) frame in the stream, and the type of encoding used for encoding the blocks or the frame.

This statistical data for a frame, which is generated by the video processor 8 as part of the encoding of the frame, is then used in the encoding of the subsequent frame in the sequence of video image frames. The statistical data is, for example, used to select the particular encoding options to use when encoding the next frame in the stream of frames being encoded. As discussed above, the set of encoding options can be for a particular source block (e.g. having a particular size in terms of data elements of the frame) and/or can include, for example, particular motion vectors and/or a particular encoding mode (intra, inter, skip, forward, backward, uni-directional, bi-directional, merge, etc.) used to derive the reference block for that particular source block (step 103, FIG. 2).

The process of gathering and using statistical data from one frame in the encoding of a subsequent frame in a sequence of frames of video image data will be described in more detail below with reference to FIG. 3.

Once the encoding options have been selected (for a source block or frame), using the statistical data generated during the encoding of a source frame, the next source frame is encoded according to these selected encoding options (step 104, FIG. 2). Once a source frame has been encoded in this manner, the encoded frame is written out by the video processor 8 to the memory 16, via the interconnect 12 and the memory controller 14 (step 105, FIG. 2).

At the same time, the process of generating a two-dimensional array of statistical data for the next source frame being encoded, using this statistical data to select encoding options for the next frame and then encoding the next frame in the stream according to the selected encoding options (steps 102-104, FIG. 2), is repeated for the subsequent frames in the stream of frames of video image data.

Also shown in FIG. 2 is the (somewhat simplified) process by which the encoded frames are decoded, when this is required. First, an encoded frame is read in from the memory 16 by the video processor 8 via the memory controller 14 and the interconnect 12 (step 106, FIG. 2). The encoded frame that has been read in is decoded by the video processor 8 (e.g. by the bitstream encoder 9 which may also be operable to decode the encoded frames) (step 107, FIG. 2). The decoded frame of video image data is then output by the video processor 8, e.g. to the display device 18 via the display controller 10.

This process is repeated for all of the frames in the stream. For blocks or frames of the encoded bitstream that have been encoded relative to other blocks or frames in the stream of frames of video image data, these blocks or frames are decoded using the blocks or frames relative to which they were encoded.

The process of gathering and using statistical data from one frame in the encoding of a subsequent frame in a sequence of frames of video image data is shown in more detail in FIG. 3.

For a frame ("Frame 1" 201) in a sequence of frames, an encoding process 202 (equivalent to step 101, FIG. 2) is applied to the frame 201 (by the bitstream encoder 9 of the video processor 8) in order to produce an encoded bitstream 203 for the frame. The encoded bitstream 203 is then output, e.g. for storage in the memory 16 of the data processing system 1 shown in FIG. 1 or for streaming to another device.

During the encoding process 202, statistical data 204 for the frame 201 is gathered by the video processor 8. This statistical data 204 is collected in a two-dimensional array corresponding to the two dimensional frame of video image data.

FIG. 4*a* shows an example of a two-dimensional array of statistical data 21 that may be generated during encoding of a frame of video image data. It should be noted that the size of the two-dimensional array 21 shown in FIG. 4*a* and the data values of the two-dimensional array 21 are a simplified version of what may be generated when encoding a frame of video image data, and are solely provided for explanatory purposes.

The two-dimensional array of statistical data 21 that is generated contains data values 22 that represent a property of the data elements of the frame of video image data being encoded. Each data value 22 corresponds, for example, to a data element or block of data elements in the frame of video image data being encoded. As indicated above, the property to be represented by the data values 22 of the two-dimensional array 21 may, for example, comprise the intensity of the blocks or pixels of the frame, the complexity of the blocks of the frame, the movement of the blocks or pixels of the frame relative to the respective blocks or pixels of a previous (or subsequent) frame in the stream, and the type of encoding used for encoding the blocks or the frame. Should plural properties be desired to be represented, then the appropriate number of two-dimensional arrays is generated.

In order to use less storage space in the memory when storing the statistical data, the two-dimensional array of statistical data 21 is converted into two one-dimensional arrays 23, 24 of data values. These two one-dimensional arrays 23, 24 are shown alongside the edges of the two-dimensional array of statistical data 21 in FIG. 4*a*.

The two one-dimensional arrays 23, 24 are produced by summing the data values 22 in each row of the two-dimensional array 21 (for the one-dimensional array in the vertical (y) direction 23), and in the columns of the two-dimensional array 21 (for the one-dimensional array in the horizontal (x) direction 24).

Thus, in other words, for a two-dimensional array 21 represented by the two-dimensional function $f(x,y)$, the two-dimensional array 21 can be factorised into two one-dimensional arrays $a(x)$ 24 and $b(y)$ 23, i.e. $f(x,y) \approx a(x)b(y)$, where $a(x) = \Sigma_y f(x,y)$ and $b(y) = \Sigma_x f(x,y)$.

Producing two one-dimensional arrays 23, 24 enables the statistical data to be stored using less memory than would be needed for the two-dimensional array 21. For example, it can be seen from FIG. 4*a* that only 16 data values are needed to store the two one-dimensional arrays 23, 24, whereas 64 data values would have been needed to store all the data values 22 of the two-dimensional array 21. It will be appreciated that the saving in memory usage increases with the size of the two-dimensional array 21.

In order to use the statistical data that is stored in the two one-dimensional arrays 23, 24 (e.g. in step 103 of FIG. 2), an approximate version of the two-dimensional array 21 is reconstructed from the two one-dimensional arrays 23, 24. FIG. 4*b* shows the reconstructed two-dimensional array of data values 25.

The approximate data values 26 of the two-dimensional array of data values 25 are reconstructed using the data values of the two one-dimensional arrays 23, 24 using:

$$f_{approx}(x,y) = \frac{a(x)b(y)}{\sum_x \sum_y f(x,y)}$$

where $f_{approx}(x,y)$ is the data value at the position (x,y) in the approximation of the two-dimensional array.

Comparing the approximate data values 26 of the two-dimensional array of data values 25 (as shown in FIG. 4*b*) with the data values 22 of the two-dimensional array 21 as generated initially (and as shown in FIG. 4*a*), it can be seen that while there is some variation in how accurately the approximate data values 26 of the two-dimensional array of data values 25 correspond to the data values 22 of the two-dimensional array 21 as generated initially (owing to the loss in detail when producing the two one-dimensional arrays of data values 23, 24), the overall trends of the data values 22 of the two-dimensional array 21 as generated initially are retained in the approximate data values 26 of the two-dimensional array of data values 25 (as illustrated by the shading in the two-dimensional arrays 21, 25 of FIGS. 4*a* and 4*b* respectively).

Thus the approximate data values 26 of the two-dimensional array of data values 25 still provide useful information that is able to be used to take decisions in the encoding of frames of video image data in the stream of frames for encoding. However, when a more accurate approximation of the data values 22 of the two-dimensional array 21 is required, a greater number of one-dimensional arrays of data values can be produced from the initial two-dimensional array 21, as will now be described with reference to FIGS. 5*a*, 5*b* and 5*c*.

Figure 5A:
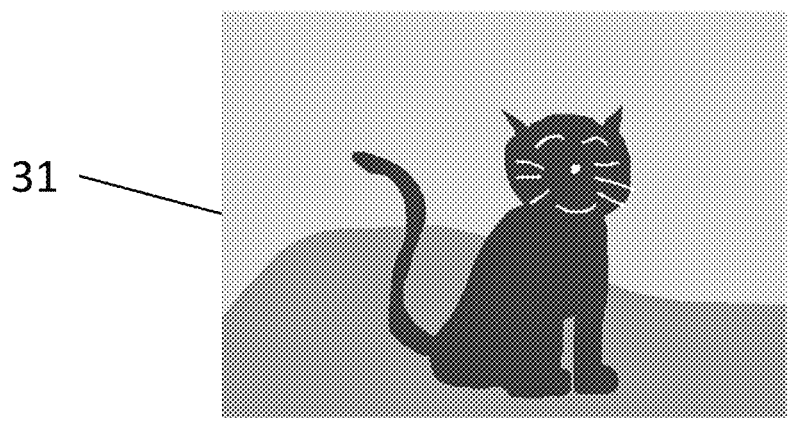
FIGS. 5a, 5b and 5c show a frame of video image data to be encoded and two-dimensional arrays of statistical data that are generated in accordance with the technology described herein.
Figure 5B:
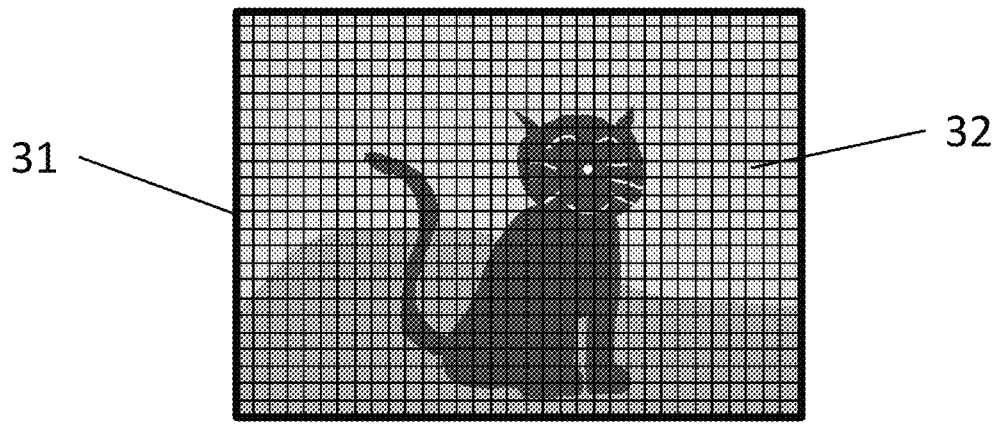

FIG. 5*a* shows a frame of video image data 31 to be encoded. FIG. 5*b* shows that the statistical data for the frame of video image data 31 can be organised by generating data values across a two-dimensional array 32 that corresponds to the area of the frame of video image data 31. Two one-dimensional arrays may then be generated for the two axes of the two-dimensional array 32, e.g. in the manner described above with reference to FIG. 4*a*.

Figure 5C:
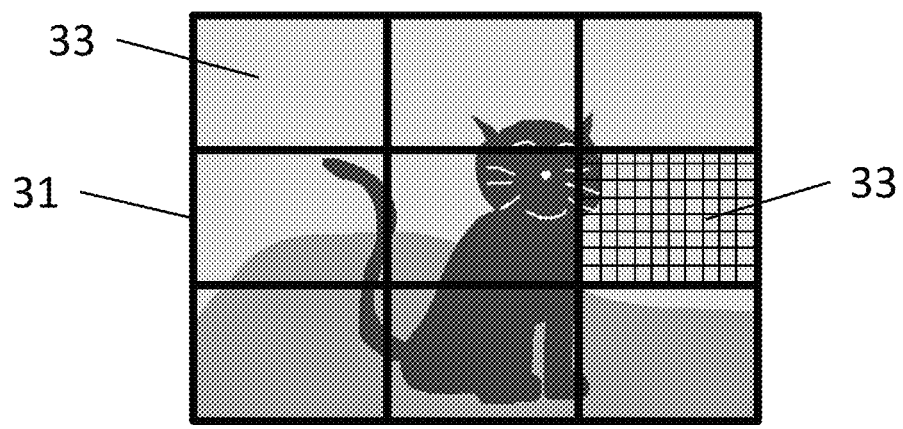

An alternative embodiment, in which greater number of one-dimensional arrays of data values is produced, will now be described with reference to FIG. 5*c*. FIG. 5*c* shows that the statistical data for the frame of video image data 31 can be organised by generating data values across plural (e.g. nine) two-dimensional arrays 33 that correspond to different regions of the frame 31.

For each of these regions, a separate two-dimensional array 33 is generated. Then, for each separate two-dimensional array of data values 33, two one-dimensional arrays of data values are produced, in the same manner as when only a single two-dimensional array is generated, except that the one-dimensional arrays of data values are produced for their respective regions of the frame of video image data.

It will be seen that dividing the organisation of the statistical data that is generated into plural two-dimensional arrays of data values 33, the one-dimensional arrays of data values will enable a more accurate approximation of the two-dimensional arrays 33 to be reconstructed when their data values are required by the encoding process.

The approximate data values 26 that are required by the encoding process for the next frame(s) are reconstructed as and when they are needed. However, the double sum $\Sigma_x \Sigma_y f(x,y)$ is accumulated when the data values 22 of the two-dimensional array 21 are generated initially (during encoding of the frame of video image data) and this single summed value is stored for use when calculating the individual approximate data values 26.

Referring back to FIG. 3, once the approximated version 205 of the statistical data 204 has been reconstructed (i.e. one or more approximate data values 26 of the two-dimensional array of data values 25 as shown in FIG. 4*b*), these data value(s) 26 can be used in the encoding process 206 for the next frame ("Frame 2" 207) in the stream of frames of video image data.

For example, the reconstructed approximate data values 26 of the two-dimensional array of data values 25 may be used to select the particular encoding options to use when encoding the next frame in the stream of frames being encoded. As discussed above, the set of encoding options can be for a particular source block (e.g. having a particular size in terms of data elements of the frame) and/or can include, for example, particular motion vectors and/or a particular encoding mode (intra, inter, skip, forward, backward, uni-directional, bi-directional, merge, etc.) used to derive the reference block for that particular source block.

As with the encoding of the previous frame ("Frame 1" 201) in the stream of frames of video image data, the encoding of this next frame ("Frame 2" 207) in the stream of frames of video image data produces an encoded bitstream 208 for the frame. Similarly, this encoded bitstream 208 is then output, e.g. for storage in the memory 16 of the data processing system 1 shown in FIG. 1 or for streaming to another device. Thus, for the frames of video image data in the stream that are encoded, an encoded bitstream of frames of video image data 203, 208 is output.

Also as was done for the previous frame ("Frame 1" 201) in the stream of frames of video image data, during the encoding process 206 for the next frame ("Frame 2" 207) in the stream, statistical data 209 for the frame 207 is gathered by the video processor 8. This statistical data 209 is again collected in a two-dimensional array corresponding to the two dimensional frame of video image data (e.g. as illustrated in FIG. 4a).

The statistical data 209 for this frame 207, which has been generated in the format two-dimensional array of data values, is used to produce two one-dimensional arrays of data values (as shown in FIG. 4a) which are then stored in the memory. These two one-dimensional arrays of data values can then be used to calculate the approximate statistical data 210 for this frame 207 (e.g. as illustrated in the two-dimensional array of approximated data values shown in FIG. 4b), when the (approximated) data values of the two-dimensional array are required for the encoding process for the next frame (e.g. "Frame 3") in the stream of frames of video image data.

This repeated process is carried out for all of the frames of video image data in the stream of frames to be encoded, thus enabling an approximated version of statistical data that has been generated for one frame in the stream to be used in the encoding of the next frame in the stream.

A number of variations, modifications and alternatives to the above described embodiments of the technology described herein would be possible, when desired.

The present embodiments can be used in any desired and suitable data processing apparatus or system in which arrays of data elements are used. Thus, as well as video processing systems, for example, the present embodiments can also be used in other data processing systems, such as image processing systems, and graphic processing systems.

As can be seen from the above, the technology described herein, in some embodiments at least, provides an improved mechanism for using statistical data in the encoding of arrays of data elements. This is achieved, in some embodiments of the technology described herein at least, by using two one-dimensional arrays of data values to approximate the data values in a two-dimensional array of data values that represent one or more properties of an array of data elements being encoded.

The foregoing detailed description has been presented for the purposes of illustration and description. It is not intended to be exhaustive or to limit the technology described herein to the precise form disclosed. Many modifications and variations are possible in light of the above teaching. The described embodiments were chosen in order to best explain the principles of the technology, and its practical application, to thereby enable others skilled in the art to best utilise the technology, in various embodiments and with various modifications as are suited to the particular use contemplated. It is intended that the scope be defined by the claims appended hereto.

What is claimed is:

1. A method of encoding arrays of data elements of a stream of arrays of data elements, the method comprising:
when encoding an array of data elements in a stream of arrays of data elements to be encoded:
producing two one-dimensional arrays of data values from the data values of a two-dimensional array of data values, wherein the data values of the two-dimensional array of data values are representative of one or more properties of at least some of the data elements in the array of data elements, and wherein the data values of the two one-dimensional arrays of data values are representative of the data values along the two dimensions of the two-dimensional array of data values respectively;
storing the two one-dimensional arrays of data values; and
using the two one-dimensional arrays of data values to approximate one or more of the data values in the two-dimensional array of data values when encoding the array of data elements or one or more subsequent arrays of data elements in the stream of arrays of data elements to be encoded;
wherein the method further comprises approximating a data value in the two-dimensional array of data values by multiplying together the data values of the two one-dimensional arrays corresponding to the row and column of the data value to be approximated in the two one-dimensional arrays of data elements, and dividing by the sum of all of the data values of the two-dimensional array.

2. The method as claimed in claim 1, further comprising generating the two-dimensional array of data values from the array of data elements, wherein the data values in the two-dimensional array of data values are representative of one or more properties of at least some of the data elements in the array of data elements.

3. The method as claimed in claim 1, wherein the one or more properties comprises the intensity or brightness of the data elements of the array, the complexity of the data elements of the array, the amount of change of the data elements of the array between arrays in the stream of arrays and/or type of encoded array that the array of data elements being encoded is encoded as.

4. The method as claimed in claim 3, further comprising assessing the complexity of the data elements of the array for each of plural regions of the array of data elements, wherein each region corresponds to a plurality of data elements of the array of data elements.

5. The method as claimed in claim 1, wherein the data values of the two-dimensional array represent a two-dimensional statistical distribution, and the two one-dimensional arrays of data values comprise respective one-dimensional statistical distributions, wherein method further comprises producing the two one-dimensional statistical distributions by factorising the two-dimensional statistical distribution.

6. The method as claimed in claim 1, further comprising producing the two-one dimensional arrays of data values by integrating the data values of two-dimensional array, for each set of data values along the direction of the one-dimensional array.

7. The method as claimed in claim 1, further comprising dividing the two-dimensional array of data values into a plurality of regions, and producing a respective plurality of pairs of one-dimensional arrays of data values to represent the data values along the two dimensions of the plurality of regions of the two-dimensional array respectively.

8. The method as claimed in claim 1, further comprising controlling the encoding of the array of data elements or one or more subsequent arrays of data elements in the stream of arrays of data elements to be encoded using the one or more approximated data values of the two-dimensional array of data values.

9. The method as claimed in claim 8, wherein the step of controlling comprises taking an encoding decision in the encoding of the array of data elements or of the one or more subsequent arrays of data elements based on the one or more approximated data values of the two-dimensional array of data values.

10. An apparatus for encoding arrays of data elements of a stream of arrays of data elements, the apparatus comprising:
 encoding circuitry operable to encode an array of data elements of a stream of arrays of data elements;
 processing circuitry operable to:
  produce two one-dimensional arrays of data values from the data values of a two-dimensional array of data values, wherein the data values of the two-dimensional array of data values are representative of one or more properties of at least some of the data elements in the array of data elements, and wherein the data values of the two one-dimensional arrays of data values are representative of the data values along the two dimensions of the two-dimensional array of data values respectively; and
 a memory operable to store the two one-dimensional arrays of data values;
 wherein the processing circuitry is further operable to:
  use the two one-dimensional arrays of data values to approximate one or more of the data values in the two-dimensional array of data values; and
  approximate a data value in the two-dimensional array of data values by multiplying together the data values of the two one-dimensional arrays corresponding to the row and column of the data value to be approximated in the two one-dimensional arrays of data elements, and dividing by the sum of all of the data values of the two-dimensional array; and
 wherein the encoding circuitry is further operable to use the one or more approximated data values of the two-dimensional array of data values when encoding the array of data elements or one or more subsequent arrays of data elements in the stream of arrays of data elements to be encoded.

11. The apparatus as claimed in claim 10, wherein the encoding circuitry is operable to generate the two-dimensional array of data values from the array of data elements, wherein the data values in the two-dimensional array of data values are representative of one or more properties of at least some of the data elements in the array of data elements.

12. The apparatus as claimed in claim 10, wherein the one or more properties comprises the intensity or brightness of the data elements of the array, the complexity of the data elements of the array, the amount of change of the data elements of the array between arrays in the stream of arrays and/or type of encoded array that the array of data elements being encoded is encoded as.

13. The apparatus as claimed in claim 12, wherein the processing circuitry is operable to assess the complexity of the data elements of the array for each of plural regions of the array of data elements, wherein each region corresponds to a plurality of data elements of the array of data elements.

14. The apparatus as claimed in claim 10, wherein the data values of the two-dimensional array represent a two-dimensional statistical distribution, and the two one-dimensional arrays of data values comprise respective one-dimensional statistical distributions, and wherein the processing circuitry is operable to produce the two one-dimensional statistical distributions by factorising the two-dimensional statistical distribution.

15. The apparatus as claimed in claim 10, wherein the processing circuitry is operable to produce the two-one dimensional arrays of data values by integrating the data values of two-dimensional array, for each set of data values along the direction of the one-dimensional array.

16. The apparatus as claimed in claim 10, further comprising dividing the two-dimensional array of data values into a plurality of regions, and producing a respective plurality of pairs of one-dimensional arrays of data values to represent the data values along the two dimensions of the plurality of regions of the two-dimensional array respectively.

17. The apparatus as claimed in claim 10, wherein the encoding circuitry is operable to control the encoding of the array of data elements or one or more subsequent arrays of data elements in the stream of arrays of data elements to be encoded using the one or more approximated data values of the two-dimensional array of data values.

18. The apparatus as claimed in claim 17, wherein the encoding circuitry is operable to control the encoding by taking an encoding decision in the encoding of the array of data elements or of the one or more subsequent arrays of data elements based on the one or more approximated data values of the two-dimensional array of data values.

19. A non-transitory computer readable storage medium storing computer software code which when executing on a data processing system performs a method of encoding arrays of data elements of a stream of arrays of data elements, the method comprising:
 when encoding an array of data elements in a stream of arrays of data elements to be encoded:
 producing two one-dimensional arrays of data values from the data values of a two-dimensional array of data values, wherein the data values of the two-dimensional array of data values are representative of one or more properties of at least some of the data elements in the array of data elements, and wherein the data values of the two one-dimensional arrays of data values are representative of the data values along the two dimensions of the two-dimensional array of data values respectively;
 storing the two one-dimensional arrays of data values; and
 using the two one-dimensional arrays of data values to approximate one or more of the data values in the two-dimensional array of data values when encoding the array of data elements or one or more subsequent arrays of data elements in the stream of arrays of data elements to be encoded;
 the method further comprising approximating a data value in the two-dimensional array of data values by multiplying together the data values of the two one-dimensional arrays corresponding to the row and column of the data value to be approximated in the two one-dimensional arrays of data elements, and dividing by the sum of all of the data values of the two-dimensional array.

* * * * *